(12) United States Patent
Buhl et al.

(10) Patent No.: US 6,471,395 B1
(45) Date of Patent: Oct. 29, 2002

(54) HEAT TRANSFER MONITORING/MEASURING DEVICE

(75) Inventors: Peter Buhl, Weingarten; Walter Reichart, Fronreute, both of (DE)

(73) Assignee: ifm electronic GmbH, Essen (DE)

( * ) Notice: Subject to any disclaimer, the term of this patent is extended or adjusted under 35 U.S.C. 154(b) by 0 days.

(21) Appl. No.: 09/506,903

(22) Filed: Feb. 18, 2000

(30) Foreign Application Priority Data

Feb. 18, 1999 (DE) .......................................... 199 06 786

(51) Int. Cl.⁷ .......................... G01K 17/00; G01K 17/06
(52) U.S. Cl. .................... 374/29; 374/142; 73/204.22
(58) Field of Search .................... 374/29, 142, 148, 374/31; 73/204.22, 204.25, 204.26

(56) References Cited

U.S. PATENT DOCUMENTS

| | | | |
|---|---|---|---|
| 3,800,592 A | * 4/1974 | Jones, Jr. ...................... | 73/181 |
| 4,319,483 A | * 3/1982 | Durham et al. .............. | 374/204 |
| 4,911,009 A | * 3/1990 | Maeda et al. ............ | 73/204.25 |
| 5,033,299 A | * 7/1991 | Tanaka et al. ........... | 73/204.25 |
| 5,074,147 A | * 12/1991 | Sarma ..................... | 73/204.15 |
| 5,186,051 A | * 2/1993 | Stecher et al. ........... | 73/204.26 |
| 5,259,243 A | * 11/1993 | Drexel et al. ............ | 73/204.22 |
| 5,263,380 A | * 11/1993 | Sultan et al. ............ | 73/204.25 |
| 5,272,915 A | * 12/1993 | Gelbach et al. ................ | 73/147 |
| 5,460,040 A | * 10/1995 | Tada et al. ................ | 73/204.25 |
| 5,537,871 A | * 7/1996 | Itsuji et al. .............. | 73/204.17 |
| 5,848,094 A | 12/1998 | Buhl et al. | |

FOREIGN PATENT DOCUMENTS

| DE | 197 19 010 | 11/1997 | |
|---|---|---|---|
| JP | 02296112 A | * 12/1990 | .............. 73/204.27 |

* cited by examiner

Primary Examiner—Diego Gutierrez
Assistant Examiner—Lydia M. De Jesús
(74) Attorney, Agent, or Firm—Nixon Peabody LLP; David S. Safran

(57) ABSTRACT

A heat transfer monitoring and/or measuring device, especially a flow indicator for media flowing through a pipe (1), tank or fitting, with a sensor housing (2) and with two sensor elements (3, 4), the sensor elements (3, 4) each having a metallic sensor surface (5) which comes into contact with the flowing medium. In the flow indicator, the problem "deposition or formation" of disruptive layers on the sensor surfaces (5) of the sensor elements (3, 4) is solved by the element (3) which is made as a heating element having an electrically conductive protective lead (6) and by the protective lead (6) forming a closed protective circuit which includes the pipe (1), tank, or the fitting, the flowing medium and the sensor element (3).

23 Claims, 4 Drawing Sheets

HEAT TRANSFER MONITORING/ MEASURING DEVICE

BACKGROUND OF THE INVENTION

1. Field of the Invention

The invention relates to a heat transfer monitoring and/or measuring device, especially a flow indicator or a flow meter for media flowing through a pipe, a tank or a fitting, with a sensor housing and with at least one sensor element, the sensor element having a metallic sensor surface which comes into contact with the flowing medium. In particular, the invention relates to a heat transfer monitoring and/or measuring device of the type known from U.S. Pat. No. 5,848,094.

2. Field of the Invention

As has been stated above, the heat transfer monitoring and/or measuring device under consideration is intended for media flowing through a pipe, a tank or a fitting, but this is only a sample enumeration. It is simply a matter of a flowing medium being present. The medium under consideration can flow also, for example, through an open trough instead of a tube and in particular, a valve or slide can be used as the fitting.

It is important to the heat transfer monitoring and/or measuring device that, in any case, the sensor surface of the sensor element comes into contact with the flowing medium. This is of course accomplished when the heat transfer monitoring and/or measuring device is located entirely within the pipe, the tank or the fitting. Generally, a heat transfer monitoring and/or measuring device of the type under consideration is, however, installed in a pipe, tank or fitting such that it projects only partially into the pipe, tank or fitting. Often this is done by the heat transfer monitoring and/or measuring device having an outside thread and being screwed with its outside thread onto a corresponding inner thread of the pipe, tank, or fitting. However, there are also installation situations which are characterized by only the sensor element, only a part of the sensor element or only the metallic sensor surface of the sensor element projecting into the pipe, tank or fitting. In the extreme case, it can be sufficient for the metallic sensor surface of the sensor element within the pipe, tank or fitting to end flush with the pipe, tank or fitting.

It was stated at the start that the invention relates to a heat transfer monitoring and/or heat transfer measuring device. The heat transfer monitoring device stands for an embodiment in which heat transfer is simply monitored, in which therefore only the presence or absence of a certain heat transfer is ascertained. Conversely, the heat transfer measuring device stands for an embodiment in which heat transfer is measured; therefore an analog measured value which corresponds to the heat transfer is obtained which can also be converted into a digitized measured value. In other words, a heat transfer monitoring device yields a qualitative statement "heat transfer present above a given threshold" or "heat transfer absent above a given threshold," while a heat transfer measuring device delivers a quantitative statement with respect to heat transfer.

Heat transfer monitoring or measuring devices of the type which are under consideration here and which were addressed differently above are used especially for acquiring heat transport by flowing media. They are then flow indicators or flow meters, in the sense of the aforementioned differentiation, the flow indicator corresponding to the heat transfer monitoring device and the flow meter corresponding to the heat transfer measuring device.

Generic heat transfer monitoring or measuring devices and flow indicators or flow meters often work according to the calorimetric principle. Generally, temperature difference measurement is used. A first temperature measurement element measures the actual measurement temperature, the measurement temperature resulting from the heat output of a heating element, the temperature of the flowing medium and the flow-dependent heat transport capacity of the flowing medium. Furthermore, generally a second temperature measurement element measures a reference temperature. For the teaching of the invention, the measurement of the reference temperature is not absolutely necessary; it can be omitted, for example, when the temperature of the flowing medium is known.

A heat transfer monitoring or measuring device or a flow indicator or flow meter can include a heating element and at least one temperature measuring element, as explained above. Here, the heating element can also assume the function of the temperature measurement element or the function of the above explained second temperature measurement element; it is then a heating and temperature measurement element.

For the purposes of the present invention, it is irrelevant whether one heating element or one temperature measurement element or whether one heating element and two temperature measurement elements or whether one heating and temperature measurement element is or are utilized. All that is important is, as stated initially, that there is at least one sensor element which can be a heating element, a temperature measurement element or a heating and temperature measurement element; in addition there can also be a second sensor element, under certain circumstances even a third sensor element.

In the prior art, heat transfer monitoring and/or measuring devices, especially flow indicators and/or flow meters of the initially desired type are extensively known, especially those which work using the calorimetric principle. In particular, heat transfer monitoring and/or measuring devices of the initially mentioned type are known in which sensor elements are built in a special manner. Thus, an embodiment is known (U.S. Pat. No. 5,848,094) in which two sensor elements, specifically a heating element and a temperature measurement element, are integrated into a sensor part of the sensor housing which comes into contact with the flowing medium without projecting significantly into the flowing medium, and the parts which are integrated into the sensor part of the sensor housing are made pin-shaped. An embodiment is also known (published German Patent Application 197 19 010) in which the sensor elements—a heating element and a temperature measurement element -are made pin-shaped and project out of the sensor housing.

In the heat transfer monitoring and/or measuring devices under consideration, the sensor housing is normally made heat-insulating, for example, from plastic, while the sensor element or sensor elements are made to have good thermal conductivity, specifically, are made of material with good thermal conductivity, for example, copper or silver. Coating the sensor elements is also known, for example, coating sensor elements made of copper with nickel, silver or gold, or coating sensor elements made of silver with gold. These coatings are exceedingly thin, for cost reasons, and thus, generally are not free of pores. Thus, a material is often chosen for the coating which is chemically more inert than the material of the sensor element otherwise is.

One problem is common to the known heat transfer monitoring and/or measuring devices, with respect to the sensor element, i.e., that disruptive layers are deposited or form on the often very small sensor surfaces which come into contact with the flowing medium and lead to the properties of these heat transfer monitoring and/or measuring devices, especially sensitivity, changing over time, generally degrading.

In the prior art, attempts have been made to meet the problem of deposition or formation of fault layers on the metallic sensor surfaces of the sensor elements which come into contact with the flowing medium, by mechanical or chemical cleaning. However, on the one hand, this is complex, and on the other hand, it cannot lead to the properties, especially sensitivity, remaining stable over time.

SUMMARY OF THE INVENTION

In view of the foregoing, a primary object of the present invention is to effect a solution of the problem of the "deposition or formation of disruptive layers" which is superior to that of the prior art.

The heat transfer monitoring and/or measuring device (hereafter, the shortened term "monitoring and measuring" will be used with "and" being understood as "and/or" in the following specification and claims) in accordance with the invention achieves the aforementioned object, first of all, by the sensor element being provided with an electrically conductive protective lead and by means of the protective lead having a closed protective circuit which comprises the pipe, tank, or the fitting, the flowing medium and the sensor element. This at protective circuit is preferably made to have resistance that is as low as possible; therefore, it has a circuit resistance as small as possible.

The teaching of the invention is based on the recognition that the disruptive layers which are deposited, or which form on the metallic sensor surfaces of the sensor elements, may be attributable to the fact that electrical, chemical and/or electrochemical processes take place on the sensor surfaces of the sensor elements, such as possible dissociation, polarization and/or ionization processes. In any case, it has been surprisingly found that the phenomena responsible for the deposition or formation of the disruptive layers on the metallic sensor surfaces of the sensor elements can be prevented when a protective circuit in which compensating currents can flow is formed in the described manner.

Tests have shown that the teaching of the invention is especially effective when the sensor housing is made thermally and electrically insulating. To this end, the sensor housing can be made of plastic. However, it is also possible to use metal as the material for the sensor housing and to provide the metallic sensor housing the thermal and electrical insulation.

The teaching of the invention is also especially effective when the sensor element which is provided with an electrically conductive protective lead is made pin-shaped and has a diameter from 0.5 to 1.2 mm, preferably roughly 0.8 mm. Here, it is recommended that a nickel-coated copper pin be used as the sensor element so that the material of the sensor element—viewed electrochemically—is more inert than the material of the pipe, tank or fitting.

As already stated, heat transfer monitoring and measuring devices of the type under consideration are generally made with two sensor elements, specifically one sensor element made as a heating element and a second sensor element made as a temperature measurement element.

In these embodiments, it is enough if only the first sensor element, therefore the sensor element made as a heating element, is provided with the protective lead. But preferably, when two sensor elements are used, they are each provided with a protective lead or with a common protective lead.

It applies to the heat transfer monitoring and/or measuring device in accordance with the invention that the sensor element or sensor elements has or have a metallic sensor surface which comes into contact with the flowing medium. It is especially advantageous if the sensor area is equal to the cross-sectional area of the sensor element or sensor elements or is only slightly larger than this cross-sectional area. Tests have shown that, then, the problem of "deposition or formation of disruptive layers" is solved especially well, and the sensor element or sensor elements remain for the most part clean.

The heat transfer monitoring and measuring devices underlying the invention include a preferably flexible component mount and electrical and/or electronic components which are located on the component mount (see, published German Patent Application No. 197 19 010). In these embodiments, the sensor element or sensor elements is or are connected by electrical conductivity to the component mount. Here, it is recommended that the teaching according to the invention be accomplished by connecting the sensor element or sensor elements via the component mount to the protective lead or protective leads.

The protective lead of the heat transfer monitoring and measuring device of the invention can, in particular, be made completely differently.

If there is a plug, then it is recommended that it be provided with a protective lead, therefore, a plug pin—or an additional plug pin, be used in the plug as the protective lead.

In the heat transfer monitoring and measuring devices in accordance with the invention, as in the known heat transfer monitoring and measuring devices, the sensor housing can be made at least partially electrically conductive, therefore at least partially metallic, but it can also be made electrically insulating, therefore it can be made of plastic. If the sensor housing is made at least partially electrically conductive, the sensor element can be connected to the sensor housing or to the electrically conductive part of the sensor housing, so that the sensor housing or the electrically conductive part of the sensor housing is available as a protective lead. Especially when the sensor housing is made electrically insulating, for example, is made of plastic, there can be a terminal lug which projects out of the sensor housing as the protective lead.

It follows from what has been stated above with respect to the teaching of the invention that, to implement the invention, something must be added to the heat transfer monitoring and measuring device in accordance with the invention itself, specifically the execution of the protective circuit which can be incorporated in the heat transfer monitoring and measuring device. Therefore, a protective circuit must be implemented which is, consequently, also the subject matter of the invention and which is characterized by the sensor element being connected via the protective lead in an electrically conductive manner to the pipe, tank or fitting so that compensation currents can flow in the protective circuit made in this way. However, this result can be achieved in other manners.

First, it is possible to provide an at least relatively low resistance connection between the protective lead of the sensor element and the pipe, tank or fitting, for example, in the form of an electrical line or an electrical bridge. It is also possible to connect the protective lead of the sensor element, on the one hand, and the pipe, tank or fitting on the other, to a certain potential each, for example, to the ground potential, the frame potential or a compensating potential.

The compensating currents which flow in the protective circuit according to the invention can be caused exclusively by electrical, chemical and/or electrochemical processes in the flowing medium, on the sensor surface of the sensor element and/or in the interaction between the flowing medium and the sensor surface of the sensor element. However, it can also be advantageous to additionally provide an external voltage source in the protective circuit, by which compensating currents flowing in the protective circuit can be adjusted and/or controlled in order to achieve optimum conditions overall.

The teaching of the invention can be accomplished especially effectively such that the sensor element within the sensor housing is connected to the protective lead with low resistance.

In particular there are various possibilities for embodying and developing the heat transfer monitoring and/or measuring device and the protective circuit in accordance with the invention.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 6:
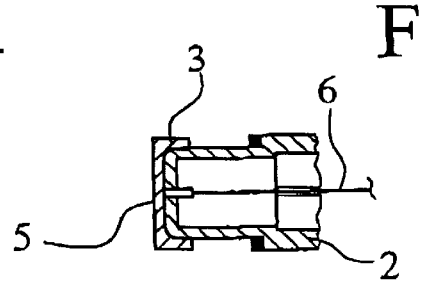
FIG. 6 schematically shows a fifth embodiment.

FIGS. 2 to 6 show heat transfer monitoring devices in the form of flow indicators for media flowing through a pipe 1 which is only partially illustrated. The monitoring devices have a sensor housing 2 and either two sensor elements 3, 4 (FIGS. 2 through 5) or one sensor element 3 (FIG. 6). The sensor elements 3, 4 each have a metallic sensor surface 5 which comes into contact with the flowing medium.

In accordance with the invention, the sensor element 3 is provided with an electrically conductive protective lead 6, and by means of the protective lead 6, a closed protective circuit is formed which comprises the pipe 1, the flowing medium and the sensor element 3. This protective circuit is preferably made to have resistance that is as low as possible; therefore, it has a circulating resistance as small as possible.

It applies to the embodiments as shown in FIGS. 2 to 5, as already stated, that two sensor elements 3, 4 are implemented, specifically a first sensor element 3 which is made as a heating element and a second sensor element 4 which is made as a temperature measurement element.

Here, it is sufficient, as shown in FIGS. 2 to 5, for only the first sensor element 3, i.e., the one made as a heating element, to be provided with the protective lead 6.

In the figures, the protective lead 6 is shown only schematically. How this protective lead can be achieved has already been mentioned, so that to avoid repetitions reference should be made to the previous statements in "Summary of the Invention" in this respect.

As already stated, preferably, the sensor area 5 is equal to the cross-sectional area of the sensor element 3 or sensor elements 3, 4 or is only slightly larger than this cross-sectional area. This is accomplished differently by the sensor elements 3, 4, in the embodiments shown in FIGS. 2, 3, and 5 than in the embodiment shown in FIG. 4, projecting only slightly out of the sensor housing 2. In the embodiment as shown in FIG. 6, the sensor area 5 corresponds to the surface of the sensor element 3 which is seated in the manner of a cap on the sensor housing 2.

To accomplish the teaching of the invention, something must be added to the flow indicator, specifically the execution of the protective circuit which can be done with incorporation of the flow indicator. Therefore, a protective circuit must be implemented, overall, which, in one example, is characterized by the sensor element 3 being connected via the protective lead 6 in an electrically conductive manner to the pipe 2, so that compensating currents can flow in the protective circuit which is made in this way. However, this can be accomplished in a different manner as well.

Figure 1A:
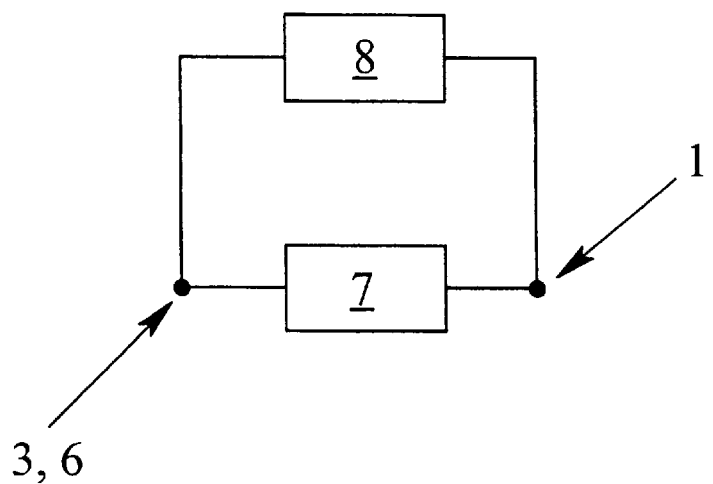
FIG 1A and FIG. 1B each show a block diagram from a general explanation of the heat transfer monitoring and measuring device and a protective circuit in accordance with the invention.
Figure 1B:
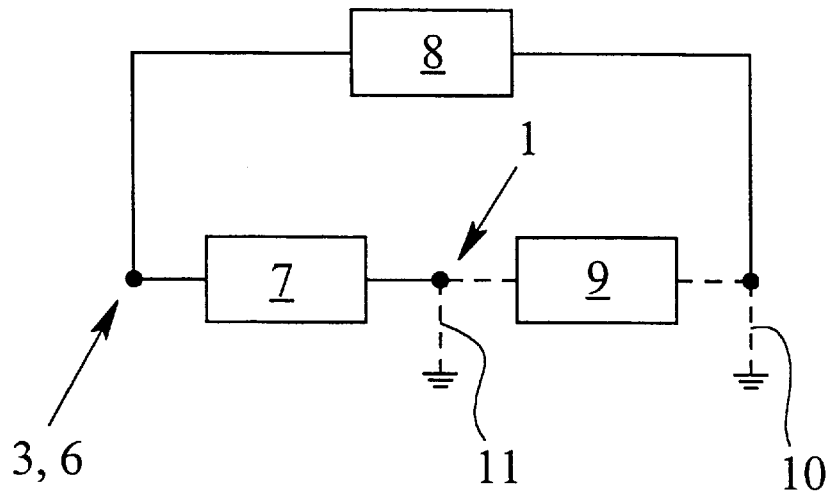

In FIG. 1A and FIG.1B, the pipe 1, the sensor element 3 and the protective lead 6 are indicated. A sensor housing resistor 7 and connecting resistors 8, 9 are also indicated is always assumed that the sensor housing is made electrically insulating, for example, it is made of plastic, so that the sensor housing resister 7 is very large.

It is indicated in FIG.1A, between the protective lead 6 and this the sensor element 3 and the pipe 1, there is a connecting resistor 8, which has extremely low resistance. Therefore, a low-resistance connection is effected between the protective lead 6 and the sensor element 3 and pipe 1.

It is also indicated in FIG. 1B that the lead 6, and thus the sensor element 3, are connected to the ground potential lead 10 instead of the pipe 1 and that, then, the pipe 1 is connected to another ground potential lead 11. The connecting resistance 9 between the first ground potential lead 10 and the second ground potential lead 11 illustrates that there is a low-resistance connection between the ground potential lead 10 and the ground potential lead 11.

Figure 2A:
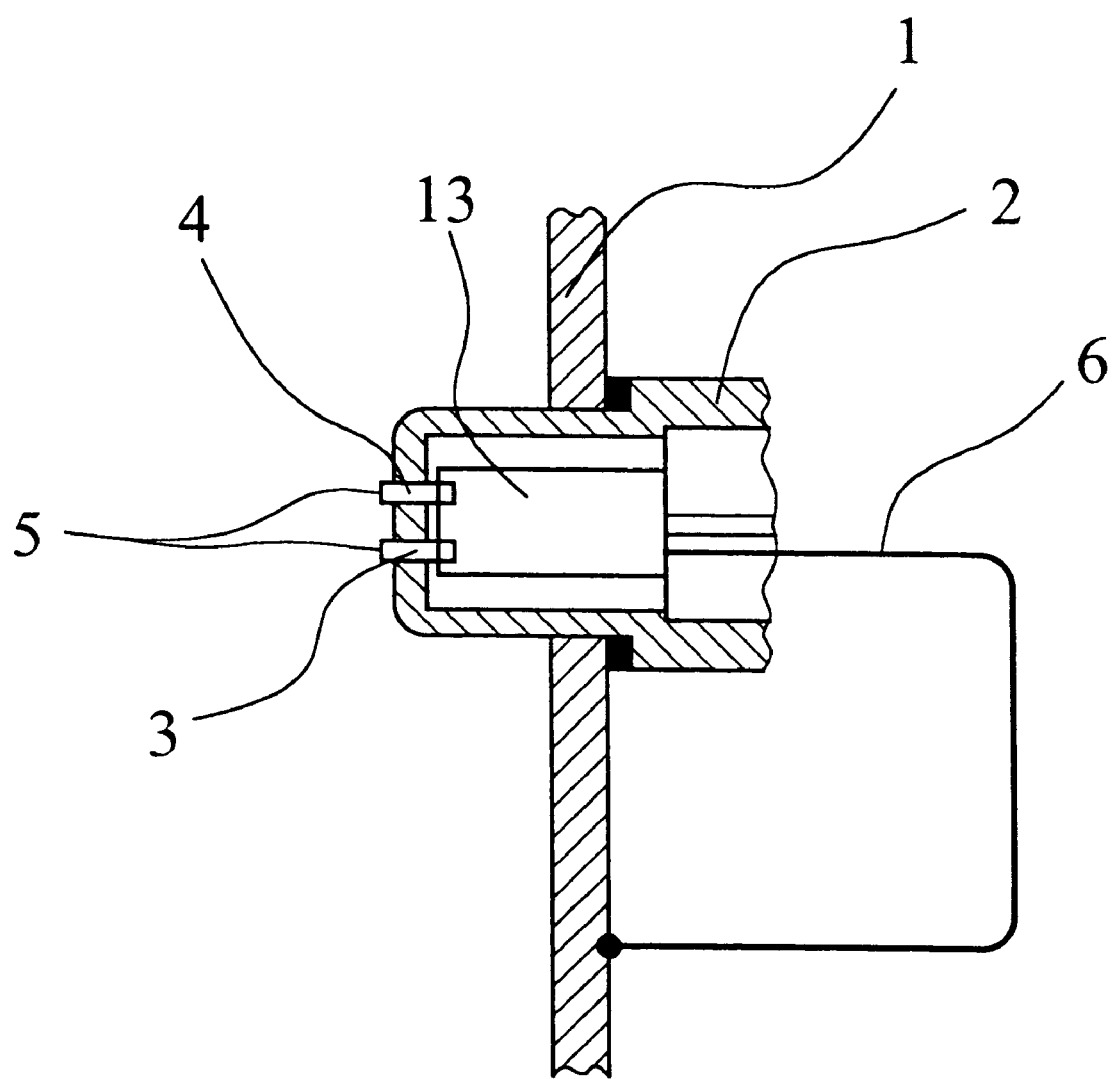
FIG. 2A and FIG. 2B schematically show a first embodiment of a transfer monitoring device in the form of a flow indicator assembled with a conventional component mount 13 which is connected to the sensor element 3 (and 4) and the electrically conductove protective lead 6, a plug 14, and a terminal lug 15 which projects out of the sensor housing as a protective lead.
Figure 2B:
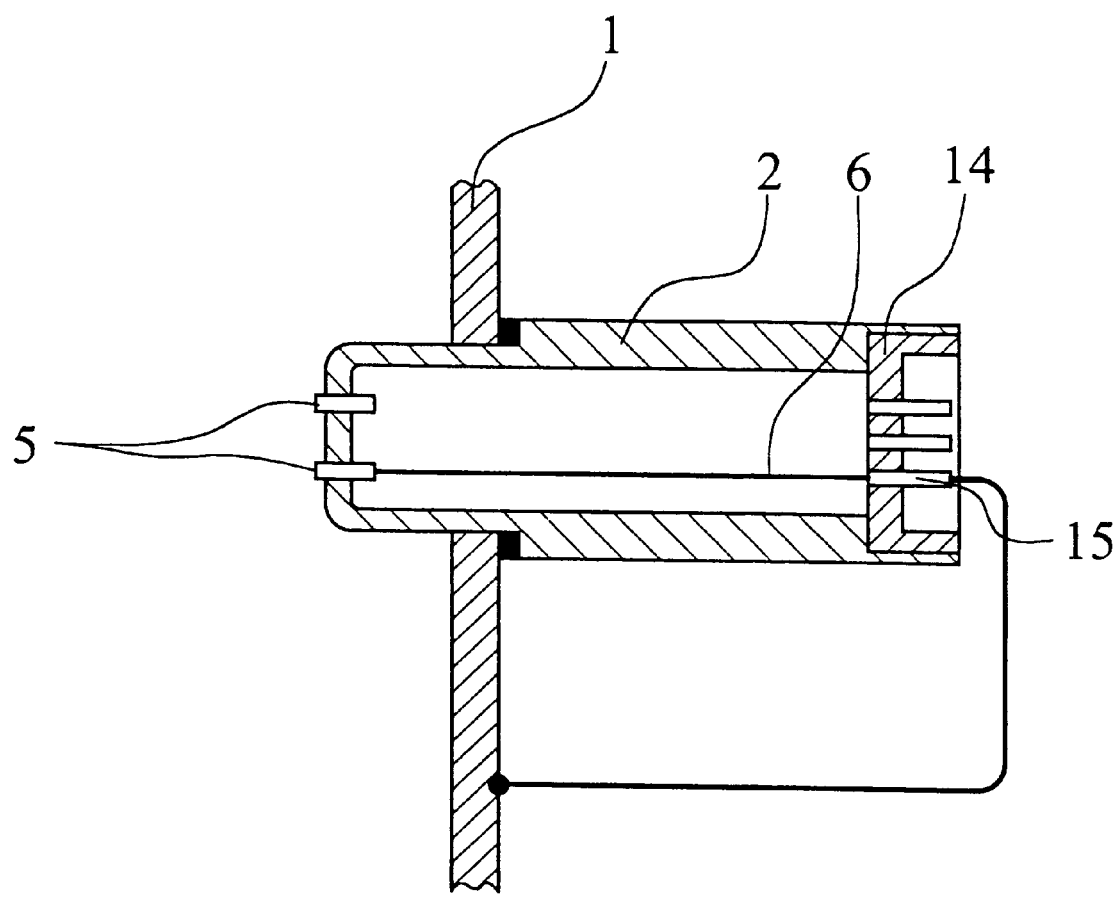
Figure 3:
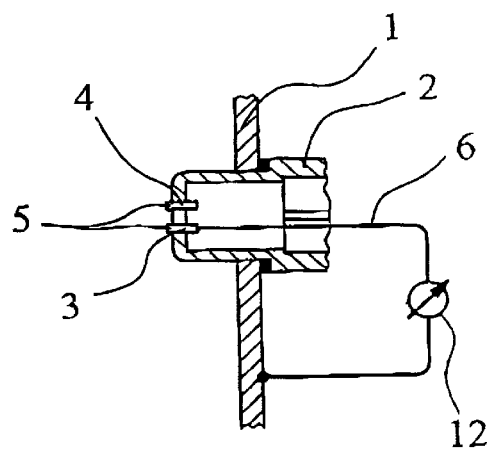
FIG. 3 schematically shows a second embodiment.

In the embodiments which are shown in FIG. 2 and 3, there is a direct connection between the protective lead 6 of the sensor element 3 and the pipe 1. Conversely, it applies to the embodiments shown in FIGS. 4 and 5, that the connection between the protective lead 6 of the sensor element 3 and the pipe 1 takes pace via the ground potential.

Figure 4:
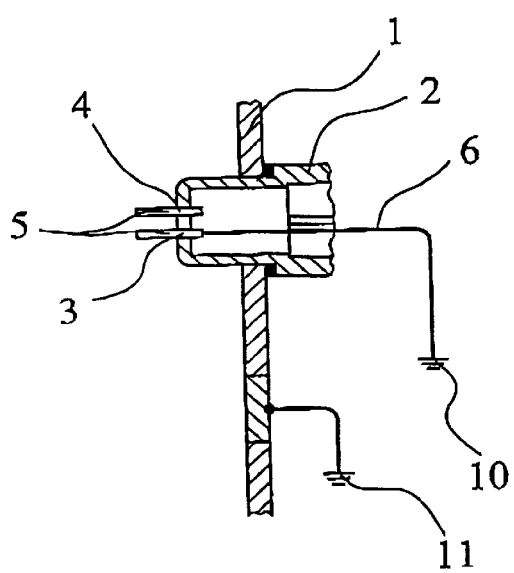
FIG. 4 schematically shows a third embodiment.
Figure 5:
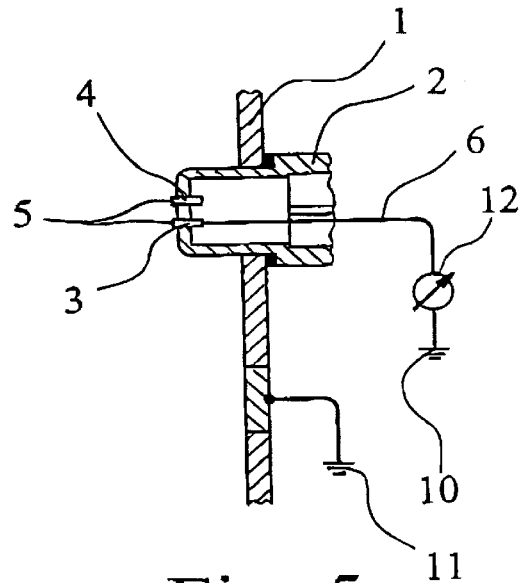
FIG. 5 schematically shows a fourth embodiment.

It applies to the embodiments shown in FIGS. 2 and 4 that the compensation currents flowing in the protective circuit of the invention are caused solely by electrical, chemical and/or electrochemical processes in the flowing medium, on the sensor surface 5 of the sensor element 3 and/or in the interaction between the flowing medium and the sensor surface 5 of the sensor element 3. Conversely, it applies to the embodiments shown in FIGS. 3 and 5 that the protective circuit additionally has an external voltage source 12 so that the compensating currents flowing in the protective circuit can be adjusted and/or controlled by the voltage source 12 in order to achieve optimum conditions overall.

We claim:

1. Heat transfer monitoring and measuring device comprising a sensor housing and at least a first sensor element assembled with the sensor housing such that the sensor element has a metallic sensor surface arranged for contacting a flowable medium in one of a pipe, a tank and a fitting; wherein the sensor element is electrically connected to an electrically conductive protective lead; and wherein the protective lead forms part of a closed protective circuit which includes said one of the pipe, tank, and fitting, the flowable medium and the first sensor element.

2. Heat transfer monitoring and measuring device as claimed in claim 1, wherein the monitoring and measuring device is one of a flow indicator and a flow meter for said flowable medium.

3. Heat transfer monitoring and measuring device as claimed in claim 1, wherein the sensor element is pin-shaped and has a diameter from 0.5 to 1.2 mm.

4. Heat transfer monitoring and measuring device as claimed in claim 3, wherein said diameter is about 0.8 mm.

5. Heat transfer monitoring and measuring device as claimed in claim 3, wherein the sensor element is a nickel-coated copper pin.

6. Heat transfer monitoring and measuring device as claimed in claim 1, further comprising at least a second sensor element, the first sensor element being a heating element and the second sensor element being a temperature measurement element, and wherein the first sensor element is provided with said protective lead.

7. Heat transfer monitoring and measuring device as claimed in claim 6, wherein both the first and second sensor elements are each provided with a protective lead.

8. Heat transfer monitoring and measuring device as claimed in claim 6, wherein the first and second sensor elements are provided with a common protective lead.

9. Heat transfer monitoring and measuring device as claimed in claim 1, further comprising a component mount; and wherein the sensor element is connected electrically conductively to the component mount and is connected via the component mount to the protective lead.

10. Heat transfer monitoring and measuring device as claimed in claim 9, further comprising a plug which forms part of the sensor housing wherein the protective lead extends through the plug.

11. Heat transfer monitoring and measuring device as claimed in claim 1, wherein the sensor housing is at least partially electrically conductive; and wherein the sensor element is electrically connected to the at least partially electrically conductive part of the sensor housing.

12. Heat transfer monitoring and measuring device as claimed in claim 1, wherein the protective lead comprises a terminal lug which projects out of the sensor housing.

13. Heat transfer monitoring and measuring device as claimed in claim 1, wherein the sensor element is connected to the protective lead within the sensor housing with a low resistance to enable a compensating current to flow through said closed protective circuit.

14. Heat transfer monitoring and measuring device as claimed in claim 1, wherein the closed protective circuit is formed by the sensor element being electrically conductively connected via the protective lead to said one of the pipe, tank and fitting.

15. Heat transfer monitoring and measuring device as claimed in claim 14, wherein the closed protective circuit further comprises the protective lead of the sensor element being connected to said one of the pipe, tank or fitting by at least a relatively low resistance connection to enable a compensating current to flow through said closed protective circuit.

16. Heat transfer monitoring and measuring device as claimed in claim 14, wherein the closed protective circuit comprises the protective lead of the sensor element and the one of the pipe, tank and fitting each being connected to one of a ground potential, frame potential or a compensating potential.

17. Heat transfer monitoring and measuring device as claimed in claim 14, wherein the closed protective circuit is also connected to an external voltage source.

18. Heat transfer monitoring and measuring device as claimed in claim 17, wherein the voltage source is a means for changing compensating currents flowing in the closed protective circuit.

19. Heat transfer monitoring and measuring device as claimed in claim 1, wherein the sensor housing is thermally and electrically insulative.

20. Heat transfer monitoring and measuring device as claimed in claim 19, wherein the sensor housing is made of plastic.

21. Heat transfer monitoring and measuring device as claimed in claim 19, wherein the sensor housing is made of metal and is provided with thermal and electrical insulation.

22. Heat transfer monitoring and measuring device as claimed in claim 6, wherein the first sensor element and the second sensor element each have a metallic sensing surface that is exposed for contacting the flowable medium.

23. Heat transfer monitoring and measuring device as claimed in claim 22, wherein the metallic sensing surface of each sensor element has an area which is substantially equal to a cross-sectional area of the sensor element.

* * * * *